(12) United States Patent
Lomas (10) Patent No.: US 12,045,420 B2
(45) Date of Patent: Jul. 23, 2024

(54) OPTICAL TOUCH SCREEN

(71) Applicant: Uniphy Limited, Leeds (GB)

(72) Inventor: David Lomas, Leeds (GB)

(73) Assignee: Uniphy Limited, Leeds (GB)

( * ) Notice: Subject to any disclaimer, the term of this patent is extended or adjusted under 35 U.S.C. 154(b) by 0 days.

(21) Appl. No.: 17/788,528

(22) PCT Filed: Dec. 23, 2020

(86) PCT No.: PCT/GB2020/053366
§ 371 (c)(1),
(2) Date: Jun. 23, 2022

(87) PCT Pub. No.: WO2021/130499
PCT Pub. Date: Jul. 1, 2021

(65) Prior Publication Data
US 2023/0035865 A1 Feb. 2, 2023

(30) Foreign Application Priority Data
Dec. 24, 2019 (GB) ...................................... 1919308

(51) Int. Cl.
*G06F 3/042* (2006.01)

(52) U.S. Cl.
CPC .. *G06F 3/0421* (2013.01); *G06F 2203/04103* (2013.01); *G06F 2203/04104* (2013.01); *G06F 2203/04105* (2013.01); *G06F 2203/04109* (2013.01)

(58) Field of Classification Search
CPC ................ G06F 3/042; G06F 3/0421; G06F 2203/04103; G06F 2203/04104; G06F 2203/04105; G06F 2203/04109
See application file for complete search history.

(56) References Cited

U.S. PATENT DOCUMENTS

| 2011/0122091 | A1 | 5/2011 | King et al. |
| 2011/0291989 | A1* | 12/2011 | Lee .......................... G06F 3/043 |
| | | | 345/175 |
| 2012/0268427 | A1 | 10/2012 | Slobodin |
| 2018/0136787 | A1 | 5/2018 | Echols et al. |
| 2019/0107922 | A1 | 4/2019 | Dearn et al. |
| 2019/0339814 | A1 | 11/2019 | Lomas |
| 2020/0371659 | A1* | 11/2020 | Kim ......................... G06F 3/044 |

FOREIGN PATENT DOCUMENTS

CN        101593785 A    12/2009

* cited by examiner

*Primary Examiner* — Nelson M Rosario
(74) *Attorney, Agent, or Firm* — Boyle Fredrickson S.C.

(57) ABSTRACT

A touch sensitive apparatus comprises a top plate configured such that light from the one or more light sources is transmitted within the top plate with total internal reflection; and a base plate within which, light is transmissible. The base plate comprises a plurality of base plate elements optically separated from each other. The top plate and the base plate are configured such that if an external body touches a first surface of the top plate, then light is coupled from a second surface of the top plate into an underlying base plate element for transmission within that base plate element. Each base plate element has one or more detectors for detecting light transmitted within that base plate element. A processor determines information from the detectors relating to touching of the first surface of the top plate. An associated method is also described.

20 Claims, 8 Drawing Sheets

Figure 3A (i) X-sectional image of Surface Contours either side of finger used as a guide

Figure 3B (ii) X-sectional image of Surface Groove used to guide finger

OPTICAL TOUCH SCREEN

BACKGROUND OF THE INVENTION

1. Field of the Invention

This invention relates to optical touch screen technology. It is particularly relevant to the construction and operation of touch screens for device control.

2. Discussion of the Related Art

The provision of touch sensitive screens for device control is becoming increasingly widespread, particularly for handheld electronic devices. Conventional touch screen arrangements may comprise an LCD display surface and a resistive or capacitive overlay that is placed over the LCD display surface. In a resistive touchscreen, when pressure is applied to the LCD display surface, via the overlay, electronic signals representative of the relative location, are generated by a controller IC and a device driver, or similar, in the host computing device interprets such signals as touch-based inputs, such as a key press or scroll action. Similarly, in a capacitive touchscreen, disturbance in the electric field, created in the overlay, is used to determine the touch action(s).

Resistive touch screens are particularly favoured for many applications in view of their low cost, low power consumption and stylus support. Resistive touch screens generally comprise conductive and resistive layers, separated by thin spaces. When a pointer, such as a finger or stylus, touches the screen, contact is made between the layers, thereby effectively closing a switch and causing current to flow. A controller determines the current between layers to derive the position of the touch point.

However, there are a number of disadvantages associated with resistive touch screens. As a result of the overlay, the screens are not fully transparent, and are generally not readable in direct sunlight. Furthermore, such screens are subject to deterioration of the pressure sensitive layers, and also require periodic re-calibration. Further still, sufficient pressure is required to be applied for detection: thus, if insufficient pressure is applied by a pointer, it will go undetected. Moreover, resistive touch screens are unable to discern that two or more pointers are touching the screen simultaneously, a function known as "multi-touch".

Capacitive type touch screens overcome some of the issues associated with resistive touch at a generally higher cost. Such systems work by detecting the capacitance change due to touch, on an embedded array of conductors. This detection can either based on the differential change in capacitance of these conductors (Self-capacitance) or in the differential change in capacitance in pairs (or sets) of these conductors (Mutual-capacitance). Disadvantages with capacitive touch screens include mis-triggering, electromagnetic interference and relatively expensive tooling costs.

One of the most significant disadvantages to both resistive and capacitive technology is their inability to inherently determine the pressure intensity of a touch with any significant dynamic range. This means that it is not easy to distinguish between a light, accidental, touch and a firmer, intended, touch, and the use of touch pressure as an additional control input cannot be inherently realised.

Other types of touch screen technology have been developed. For example, the present applicant has devised an alternative technology described in WO2015/155508 based on frustrated total internal reflection. This addresses a number of the problems of conventional touch screens.

However, alternative touch screens are still generally limited in use to conventional device displays in which a flat glass sheet forms a front user interface surface for a device. It would be desirable to expand the use of touch screen technology so that it could be used effectively and reliably in contexts where this form factor was inconvenient or inappropriate.

It is against this background that the present invention has been devised.

SUMMARY OF THE INVENTION

In a first aspect, the invention provides a touch sensitive apparatus comprising: a top plate having one or more light sources associated therewith, such that light from the one or more light sources is transmitted within the top plate with total internal reflection; a base plate, wherein light is transmissible within the base plate, wherein the base plate comprises a plurality of base plate elements optically separated from each other; wherein the top plate and the base plate are configured such that if an external body touches a first surface of the top plate thereby performing a touch, then light is coupled from a second surface of the top plate into an underlying base plate element for transmission within that base plate element; wherein each base plate element has one or more detectors associated therewith for detecting light transmitted within that base plate element; the touch sensitive apparatus further comprising processing means to determine information from the detectors relating to touching of the first surface of the top plate.

Using this approach, a touch sensitive apparatus with a wide range of functionalities can be achieved. The touch screen apparatus can be designed for specific functions, such as control functions, and the design can be optimized for effective user interaction. Moreover, in embodiments multiple touches and complex motions can be used effectively to provide inputs.

In embodiments, one or more of the base plate elements is of a first base plate element type adapted to detect presence or absence of a touch but not position of the touch. Such a base plate elements of the first base plate element type may also be adapted to detect intensity of pressure of a touch. This base plate element type can be effective on its own to provide a button-like touch screen element, or can be used in combination with other base plate elements to achieve a more complex functionality.

In embodiments, one or more of the base plate elements is of a second base plate element type having a first end and a second end, one or more first end detectors associated with the first end and one or more second end detectors associated with the second end, wherein the base plate element of the second type is adapted to detect presence of a touch and position of the touch between the first end and the second end.

Again, one or more of the base plate elements of the second base plate element type may also be adapted to detect intensity of pressure of a touch. However, here, the processing means may also be adapted to detect motion along base plate elements of the second type between the first end and the second end. This allows the base plate element to provide the functionality of a slider, or as will be seen below, a dial. Again, more complex functionality may be provided in combination with other base plate elements.

One or more of the base plate elements of the second type may not be substantially rectangular, for example it may describe a curve between the first and the second end.

In embodiments, the top plate may be non-planar—it may be grooved or contoured, for example. For example, one or more base plate elements lies under a groove or indentation in the top plate. The apparatus may comprise a groove in the top plate with a base plate element of the second type lying underneath the groove—such a groove may act as a finger guide. Such curvature does not prevent effective device operation—the extent of the curvature is only bounded by the need to retain the light within the top plate by means of total internal reflection.

In some embodiments, there may be one or more projecting regions elevated from the top plate having one or more base plate elements associated therewith. At least one of these projecting regions may comprise a central region with a circumferential edge region between the central region and a planar region of the top plate. The circumferential edge region may have one or more base plate elements associated therewith. This circumferential edge region may have a base plate element of the second type disposed thereunder to detect touches on the circumferential edge region. The processing means may thus provide the base plate element of the second type disposed under the circumferential edge region with functionality of a dial. The circumferential edge region may have one or more base plate elements of the first type disposed thereunder to detect touches on the circumferential edge region. One or more base plate elements may lie underneath the central region. The base plate element lying underneath the central region may be of a third base plate element type, wherein the base plate element of the third type is adapted to detect presence of a touch and position of the touch on the central region.

In this way, it can be seen that embodiments of the invention provide a touch sensitive screen comprising a plurality of independent touch sensitive screen elements as described above, and these may use base plate elements of at least three different type. The touch sensitive screen elements may be configured such that the top plate of the arrangement is continuous and the base plate is segmented. For example, the top plate may be formed of a single, continuous, sheet or panel of material, and the base plate may be segmented to define the different touch sensitive areas of the screen. The top plate may be optically continuous over a plurality of base plate elements. Individual base plate elements—as so touch screen elements, may define a straight or a curved path on a plane, or may describe a circular path around a ring.

The processing means will typically be adapted to determine which of the plurality of touch sensitive screen elements has been touched, but may make many further determinations. It may determine an order in which the touch sensitive screen elements have been touched. It may further determine whether multiple touch sensitive elements are touched at the same time. The touch sensitive apparatus may be adapted to determine simultaneous touches associated with different base plate elements, and the processing means may then be adapted to associate simultaneous touches on different base plate elements with a user action. The processing means may determine an intensity, or touch pressure, or even rate of change of touch pressure of a touch by the external body.

In embodiments, a display element is disposed beneath one or more of the base plate elements.

In embodiments, some or all of the base plate elements are lossy. The approach taught in WO2015/155508, in which frustrated total internal reflection is used in combination with a lossy base plate, is particularly effective for use in embodiments of the invention. Losses in transmission between entry of light into the base plate element and the one or more detectors associated with the base plate may then be used by the processing means to determine the position of a touch. In embodiments, lossy base plate elements are doped to provide transmission losses. Different levels of doping may be provided in different base plate elements. For example, different levels of doping may be provided in base plate elements of different base plate element types.

The base plate elements may desirably be optically separated from the other base plate elements. A mask layer may be provided between the top plate and the base plate elements to provide optical separation. Cut outs may be used in the base plate to disconnect one base plate element from another. One or more mouldings may be provided to separate base plate elements from other base plate elements. A coating may be provided around some or all of the base plate elements to prevent optical transmission between that base plate element and other base plate elements. These approaches may be used on their own or in combination depending on the needs for that embodiment.

In a second aspect, the invention provides a method of operating a user interface comprising touch sensitive apparatus, the touch sensitive apparatus having a top plate having one or more light sources associated therewith, such that light from the one or more light sources is transmitted within the top plate with total internal reflection, a base plate, wherein light is transmissible within the base plate, wherein the base plate comprises a plurality of base plate elements optically separated from each other, wherein the top plate and the base plate are configured such that if an external body touches a first surface of the top plate thereby performing a touch, then light is coupled from a second surface of the top plate into an underlying base plate element for transmission within that base plate element, a plurality of detectors, wherein each base plate element has one or more detectors of the plurality of detectors associated therewith for detecting signals from light transmitted within that base plate element, and the touch sensitive apparatus further comprises processing means, the method comprising the processing means:

detecting a plurality of user touch events at the touch sensitive apparatus from signals received from the plurality of detectors; and interpreting the plurality of user touch events as a user interface action.

In embodiments, the plurality of user touch events is associated with a plurality of base plate elements. In certain embodiments, two or more of the plurality of user touch events are associated with the same base plate element.

In some cases, the plurality of user touch events are simultaneous. In other cases, the plurality of user touch events relates to a single touch at a plurality of points in time. Here, the plurality of user touch events may be interpreted as a swipe action or a scroll action.

In certain embodiments, the plurality of user events relates to a plurality of simultaneous touch events at a plurality of points in time. In one such case, the touch sensitive apparatus has a projecting region elevated from the top plate with a circumferential edge region having one or more base plate elements thereunder to detect touches on the base plate, the method further comprising detecting the plurality of simultaneous touch events at a plurality of points in time as a rotation action.

BRIEF DESCRIPTION OF THE DRAWINGS

In order that the invention may be more readily understood, preferred non-limiting embodiments thereof will now be described, by way of example only, with reference to the accompanying drawings, in which:

FIG. 9B is a perspective view of a mask layer which may sit between a top plate and the segmented base plate of FIG. 9A in a screen arrangement of the invention;

In the drawings, as well as in the following description, like features are assigned like reference signs.

DETAILED DESCRIPTION OF EXAMPLE EMBODIMENTS

Embodiments of the invention described below use a functional system based on frustrated total internal reflection described in WO2015/155508, which is incorporated by reference herein to the extent permitted by law. This functional system will now be described with reference to FIG. 1.

Figure 1:
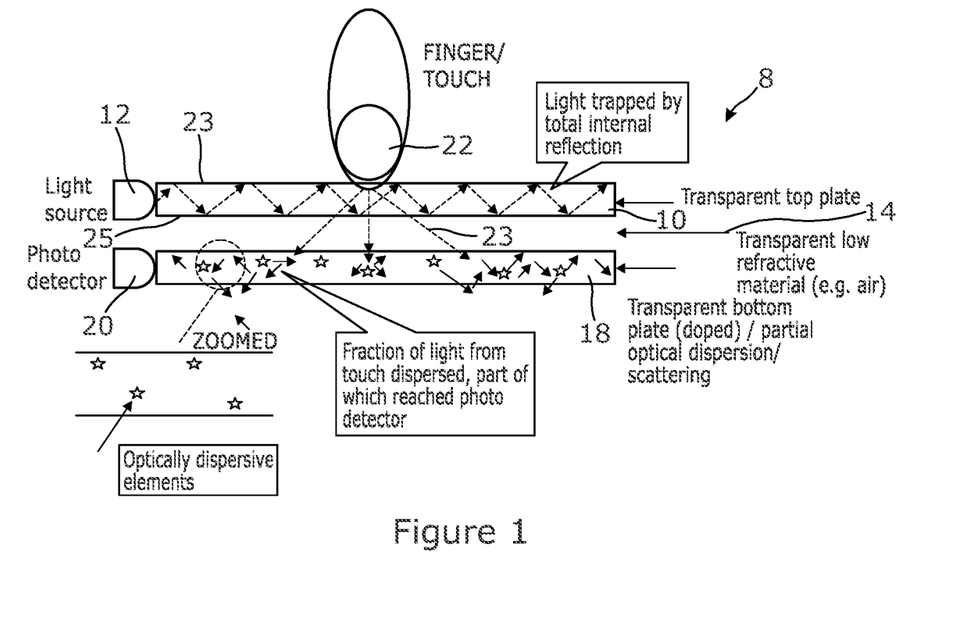
FIG. 1 is a schematic cross-sectional view of a touch screen arrangement.

FIG. 1 shows a touch screen arrangement 8 that comprises an optically transparent top plate 10 and one or more light sources 12 located at an edge or multiple edges thereof. The top plate 10 may be formed of any optically transparent material, e.g. glass or acrylic. The light source 12 may comprise a light emitting diode (LED) or other known light source, as will be apparent to a person skilled in the art. A lens (not shown) may be provided between the light source 12 and the edge of the top plate 10, if required, in order to focus and/or laterally spread the illuminating light. The light source 12 may comprise infrared or visible, intensity modulated light sources, such that the arrangement works effectively in bright ambient conditions. A plurality of light sources 12 may be provided. In this case, the ability to accurately detect touch position can be enhanced by uniquely modulating each light source 12 using either a spread spectrum based approach or multiple modulation frequencies. It should be noted that although the light sources 12 are shown provided at the edge of the top plate 10 in FIG. 1, light may be injected into the top plate 10 from different positions in other embodiments.

Located below the top plate 10, there is an optional middle layer 14 having a refractive index which is less than that of the optically transparent plate. In the example shown, the middle layer 14 is comprised of air, but the substance used for the middle layer 14 is only constricted by the requirement that it have a lower refractive index than the material used for the top plate 10.

The top plate 10 is illuminated by the light source(s) 12 so as to cause total internal reflection of the light within the top plate 10. Total internal reflection is a phenomenon that occurs when an incident light wave strikes a medium boundary at an angle larger than a particular critical angle with respect to the normal of the surface. If the refractive index is lower on the other side of the boundary and the incident angle is greater than the critical angle, the light cannot pass through the boundary and is entirely reflected within the medium.

The touch screen arrangement 8 further comprises an optically dispersive and lossy bottom, or base, plate 18 and a sensor 20 in the form of a photo detector located at an edge thereof. The bottom plate 18 has a dispersive property which causes light incident thereon from above to be dispersed towards its edges, as well as being lost from the upper and lower surfaces of this plate, in such a manner as to form a dominantly lossy plate. Such dispersive property can be achieved in a number of different ways, as will be apparent to a person skilled in the art. For example, the plate 18 of FIG. 1 has therein embedded microscopic optically refractive and/or or reflective particles or molecules 18a. In other words, the base plate 18 is doped with light scattering particles 18a to provide transmission losses with respect to light travelling in the base plate 18. Such particles 18a cause light incident thereon to be refracted and/or reflected and consequently scattered within the bottom plate 18, thereby causing scattering/loss as the light spreads out across the plate 18 toward the edges, (as well as causing light to be lost through the upper and lower surfaces of this plate), such that it can be detected by the photo detector 20. Other methods of providing the bottom plate 18 with similar dispersive and lossy properties may include coating the bottom plate 18 with a diffracting/dispersive substance, or surface patterning.

In the event that a pointer such as a stylus or finger 22 touches a first surface 23 the top plate 10, the total internal reflection within the top plate 10 is interrupted by means of frustrated total internal reflection (FIR). This causes some light 23 to be transmitted through the top plate 10 and the middle layer 14 to the bottom plate 18, such that light is coupled from a second surface 25 of the top plate 10 into the underlying base plate 18 for transmission within the base plate 18. The dispersive/lossy properties of the bottom plate 18 cause the light incident thereon from above to be dispersed and scattered in a lossy manner, as previously described, through the plate 18 toward the edges, such that part of said light is detected by the photo detector 20. Increased pressure from a pliable pointer, such as a finger 22, causes a greater area of contact and an increased degree of contact underneath the finger 22 causing more of the totally internally reflected light to be interrupted, and hence increasing the intensity of the evanescent light emitted from the top plate 10.

It will be appreciated that the location at which the top plate 10 is touched will determine the relative location on the bottom plate 18 at which light is incident and, therefore, the distance of said incident light from the edges of the bottom plate 18 (i.e. the distance over which light needs to travel to reach the photo detector edge). As a result, the relative amount of light detected by the photo detector 20 will be entirely dependent on the location at which the top plate 10 is touched and, therefore, the location on the bottom plate 18 at which light is incident. Furthermore, the intensity or pressure of a touch on the top plate 10, i.e. how hard the top plate 10 is pressed by the user, determines the absolute amount of light that is released from the top plate 10, and thus the absolute amount or intensity of light that is captured by the base plate 18. The absolute light intensity detected by the sensors 20 for a given touch position is therefore indicative of the touch intensity or pressure, such that a higher absolute intensity of light indicates a harder, more forceful, touch, and a lower intensity of light indicates a lighter, less forceful, touch to the top plate 10.

The scattering/dispersive property of the lossy bottom plate 18 may be used to control the behaviour of the attenuation of the captured light with distance from the originating touch, so that the location of the touch point can be uniquely calculated, and accuracy of the position of touch controlled. The profile of the attenuated captured light with distance may also be controlled, by controlling the profile of the concentration of the scattering/dispersive material 18*a* embedded in the bottom plate 18.

Processing means (not shown) are provided for receiving data from the photo detector(s) 20, representative of the amount and intensity of light detected thereby, such that the location of the touch point on the top plate 10 and the nature and/or shape of the touch can be calculated. By comparing the relative intensity at each photodiode 20, and their relative locations, as well as by using knowledge of the dispersive and attenuative properties of the bottom plate 18, it is possible to calculate the position and nature of a touch or even multiple touches. A device driver (not shown) will then be able to interpret the resultant data as a touch-based input, such as key press or scroll action.

Embodiments of the present invention will now be described in more detail. Using one or more basic elements using the functional system described in FIG. 1, a versatile range of touch screen structures can be developed which achieve a wide range of functionalities.

Figure 2:
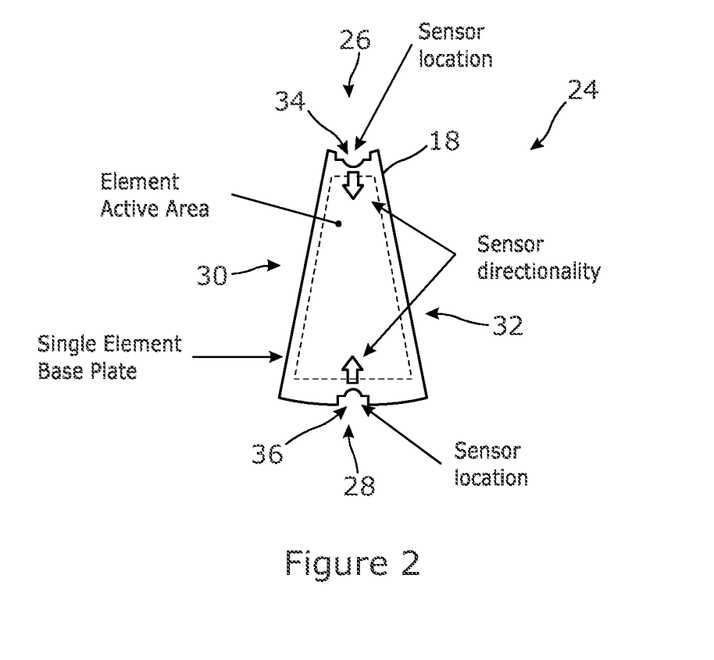
FIG. 2 is a plan view of a base plate consisting of a single touch screen element.

FIG. 2 illustrates an implementation of one type of touch screen element 24 in accordance with an embodiment of the invention. Specifically, FIG. 2 shows the base plate 18 of this element 24 in plan view. As will be described below, elements 24 of this type may not be required to locate a touch across an extended 2D region—they may have more dimensionally restricted, or functionally restricted, purposes. However, as it will be shown thereafter, the use of multiple elements 24 may achieve a wide range of functionalities.

Although not shown, in the embodiment of FIG. 2 the top plate 10 is generally the same size and shape as the base plate 18, and overlies the base plate 18. In this way, the screen arrangement 8 is configured such that the base plate 18 captures light transmitted out of the top plate 10, when a user touches the top plate 10. In other embodiments, the top plate 10 may extend beyond the base plate 18, such that only a portion of the top plate 10 has touch functionality, this area being the area that overlies the base plate 18.

The base plate 18 and the top plate 10 are each elongate in this case and, in the version shown in FIG. 2, are generally trapezoidal in shape, having first and second ends, 26 and 28 respectively, joined by first and second sides, 30 and 32 respectively. However, it should be understood that the shape of the top and base plates 10, 18 is not limited to this specific shape, and these plates 10, 18 could be any number of other shapes, such as a simple rectangle, or a more complex shape such as a horseshoe.

A first sensor 34 is provided at the first end 26 of the base plate 18 and a second sensor 36 is provided at the second end 28 of the base plate 18. The first and second sensors 34, 36 are directed inwardly towards the base plate 18, and towards each other, so as to detect light exiting the base plate 18 at its first and second ends 26, 28—multiple sensors 20 may be used at a base plate end 26, 28 to improve sensitivity or range. The use of multiple sensors 20 improves overall collection efficiency of light, as well as adding a further degree of accuracy to the determination of touch position within the element 24. As will be described further below, embodiments may use only one sensor 20 at one end of the base plate 18 if more limited functionality is required.

As in the arrangement of FIG. 1, at least one light source 12 is arranged at an edge of the top plate 10, although in other embodiments the light source 12 may inject light into the top plate 10 from other positions. In use, light is injected into the top plate 10 from the one or more light sources 12, and undergoes total internal reflection in the top plate 10.

When a user touches the top plate 10, light is transmitted downwardly out of the top plate 10, and into the base plate 18 below, which in this example, as in that of FIG. 1, is doped with light scattering particles (not shown in FIG. 2) to provide the lossy and dispersive characteristic of the base plate 18. The location within the top plate 10 in which the touch occurs determines the distance over which light captured in the base plate 18 must travel to reach the first and second sensors 34, 36.

In a similar manner to that already described in respect of the arrangement of FIG. 1, processing means (not shown) receive data from the first and second sensors 34, 36, representative of the amount and intensity of detected light, and calculate the position along the length of the base plate 18 between its first and second ends 26, 28 at which the escaped light from the top plate 10 is incident. In this way, the corresponding touch position on the top plate 10, i.e. the touch position along the length of the top plate 10 between its first and second ends 26, 28, and the nature of the touch, can be determined. Thus, this arrangement allows for motion along the base plate 18, for example in the form of a sliding or sweeping action, i.e. an action in which a user slides or sweeps their finger or a pointer along a length of the touch screen element 24 between its first and second ends 26, 28, to be detected. The sampling rate of the arrangement 8 of this embodiment is around 50 samples per second. Thus, the time response of the system is essentially instantaneous, allowing a user to sweep or scroll at any feasible speed, without noticing any time lag. It should be noted that the system is not limited to this particular sampling rate, and in other embodiments the sampling rate may be higher, or indeed lower.

A device driver in a processing means (not shown) receiving data from the detectors then interprets the resultant data. There may also be a display screen or other display means (not shown in FIG. 2) positioned below the base plate 18, and this may be controlled based on the nature and position of the touch.

For example, the display screen may be controlled to illuminate at a position corresponding to the position of the touch on the top plate 10, such that the area of the display screen directly below the touch point on the top plate 10 is illuminated.

In another example, the display screen may be controlled to illuminate in a region remote from the touch point, for example in dependence on the type of touch and the pressure/force of the touch. In this case, it would be possible for the touch screen element 24 to not overlie any part of the display screen.

Because the position of a touch along the length of the top plate 10 can be determined at any point in time, scrolling or sweeping actions along the length of the top plate 10 can also be detected. In response to such an action, the display screen may be controlled to illuminate to follow the sweeping action, for example.

Furthermore, although the embodiment of FIG. 2 includes a sensor 20 at each end of the base plate 18, in other embodiments one or more sensors 20 may instead be included at one end of the base plate 18 only. In such embodiments, the presence of a touch on the top plate 10 can be detected, but the exact position of the touch cannot be determined. The sensor 20 will just then record presence or absence of a touch at a particular point or period of time. This is thus a different type of base plate element, providing different functionality from that shown in FIG. 2.

Figure 3A:
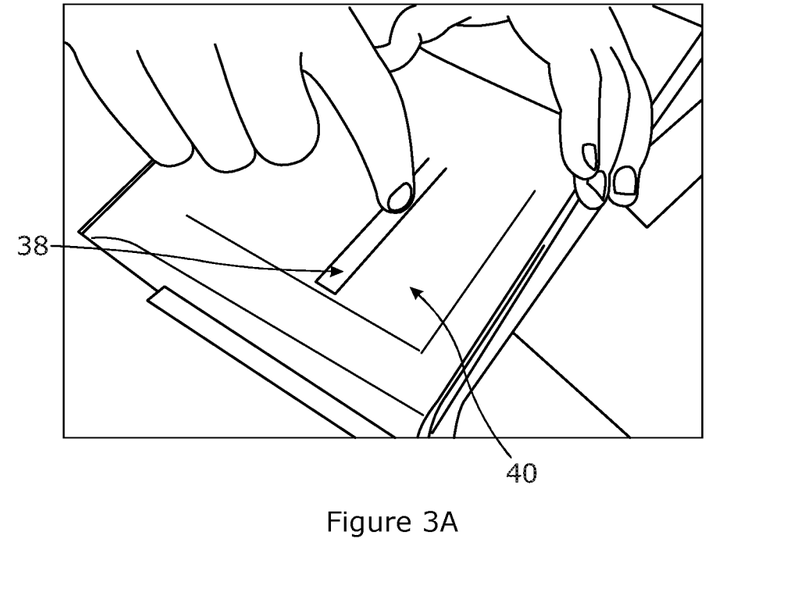
FIG. 3A shows a touch screen arrangement incorporating a touch screen element.

FIG. 3A illustrates an embodiment of the invention in which a top plate 10 similar to that of FIG. 2 forms part of a larger, extended, planar top plate 10, and defines a touch detection region 38 of the top plate 10. Correspondingly, the base plate 18 forms part of a larger, extended, planar base plate 18, and defines a light collection region of the base plate 18.

Figure 3B:
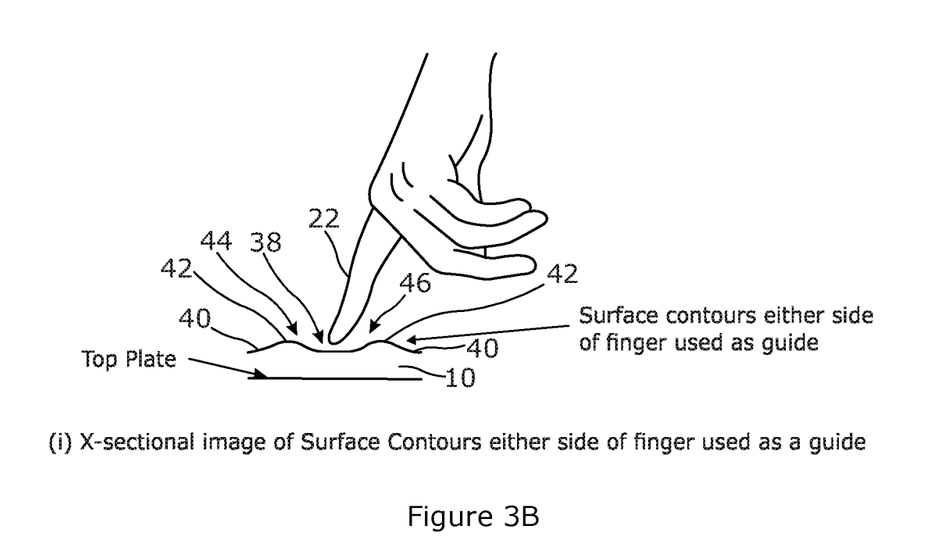
FIG. 3B is a cross-sectional view of the top plate of the touch screen arrangement of FIG. 3A, showing contouring of the top plate that provides a finger guide.
Figure 3C:
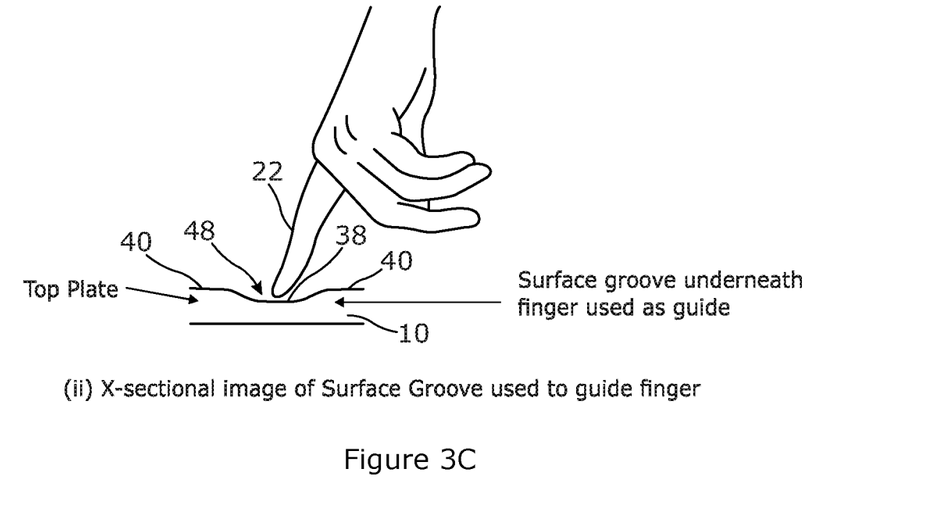
FIG. 3C shows an alternative arrangement of the top plate of the touch screen arrangement of FIG. 3A.

The touch detection region 38 is demarcated from the surrounding region 40 of the top plate 10 by means of two ridges or contours 42 provided on the top plate 10, and arranged to extend along first and second sides, 44 and 46 respectively, of the touch detection region 38 to orient the finger 22 of a user in use, and provide a finger guide, as illustrated in FIG. 3B. That is, the contours 42 assist or enable the user to identify the area of the top plate 10 that functions as the touch detection region 38, and act as a guide for the user's finger 22 when sweeping or scrolling along the length of the touch detection region 38. FIG. 3C shows an alternative arrangement that may be utilised in embodiments of the invention, in which a surface groove 48 in the top plate 10 functions as a guide for a user finger 22 or stylus.

The light collection region defines a portion of the base plate 18 that is optically isolated from a surrounding portion of the base plate 18, to essentially define a base plate element within the larger base plate. Use of optical isolation between different base plate elements can be used more generally provide different functionality in different regions, by providing discrete touch screen elements which can be used independently of each other. New functionality can also be achieved by considering interactions with different touch screen elements together, as will be described further below.

Light is injected into the top plate 10 from one or more light sources 12 located at an edge or multiple edges of the top plate 10, and one or more sensors 20 for detecting intensity of light are provided at each end of the light collection region, or base plate element 50, of the base plate 18.

As in the embodiment of FIG. 2, processing means determine the position of a touch, and a touch in the touch detection region 38 of the top plate 10 may, for example, cause illumination of the region directly below the touch. Furthermore, scrolling or sweeping actions along the length of the touch detection region 38 can be detected and responded to accordingly.

In the arrangements of FIGS. 1 to 3, the top plate 10 and the base plate 18 are generally planar sheets of material, having generally planar first or upper surfaces 52. However, in some embodiments of the invention, the top and base plates 10, 18 of the screen arrangement 8 may be curved.

As will be understood by the skilled person, it is generally challenging for other types of touch screen technologies to utilize curved screen arrangements, due to the nature of the touch detection processes used. However, the underlying technology that supports the embodiments of the present invention described here is flexible and robust enough to allow it to be implemented in not only curved screens, but a wide variety of non-planar structures.

Figure 4:
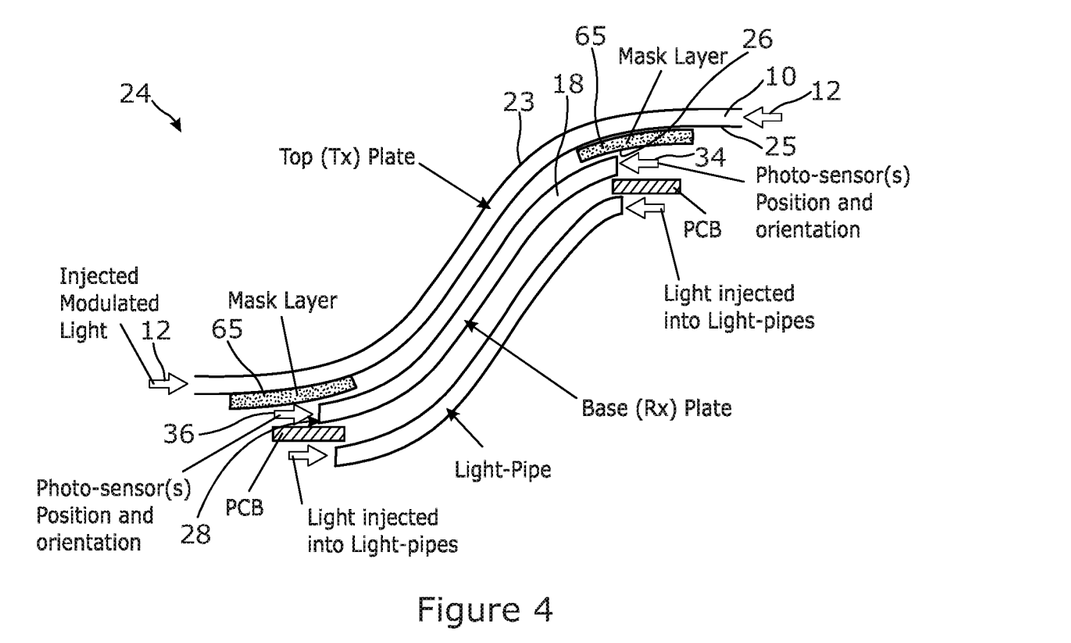
FIG. 4 is a schematic cross-sectional view of a touch screen element having a curved profile.

FIG. 4 shows a different approach to that of FIG. 3A of using a touch screen element 24 of the type shown in FIG. 2 in connection with a non-planar surface.

In particular, FIG. 4 shows a touch screen element 24 comprising a top plate 10 and a base plate 18 similar to that of FIG. 2, but having a curved profile instead of a flat profile.

In this embodiment, the top plate 10 is curved such that its first and second ends 26, 28 are positioned at different levels or elevations, and thus lie in different planes in the screen arrangement 8. Thus, the first or upper surface 23 of the top plate 10 is curved between the plane of the first end 26 and the plane of the second end 28. As in the embodiment of FIG. 2, light is injected into the top plate 10 from one or more light sources 12 located at an edge or multiple edges of the top plate 10, and undergoes total internal reflection in the top plate 10. As explained in respect of FIG. 2, light may be injected from other positions in other embodiments, and it is not a requirement that the light be injected at edges of the top plate 10.

The base plate 18 is positioned beneath the top plate 10, and is spaced apart from the top plate 10 to define an optional middle layer 14 between the top and base plates, which in this embodiment comprises air. Masking strips 65 are provided between the top plate 10 and the base plate 18 in this embodiment to mask electronics and support structures provided beneath the top plate 10 from the user. The base plate 18 is curved so as to follow and match the curvature of the top plate 10 in this example. A first sensor 34 is provided at the first end 26 of the base plate 18 and a second sensor 36 is provided at the second end of the base plate 18. The first and second sensors 34, 36 are directed inwardly towards the base plate 18, so as to detect light exiting the base plate 18 at its first and second ends 26, 28.

In use, light transmitted out of the top plate 10 when a user touches the top plate 10 is captured by the base plate 18. Detection and processing of a touch action, in this case, is substantially the same as that described in respect of the arrangement of FIG. 2, although it will be understood that small additional losses may be seen in a curved system compared to a substantially flat system.

Figure 5:
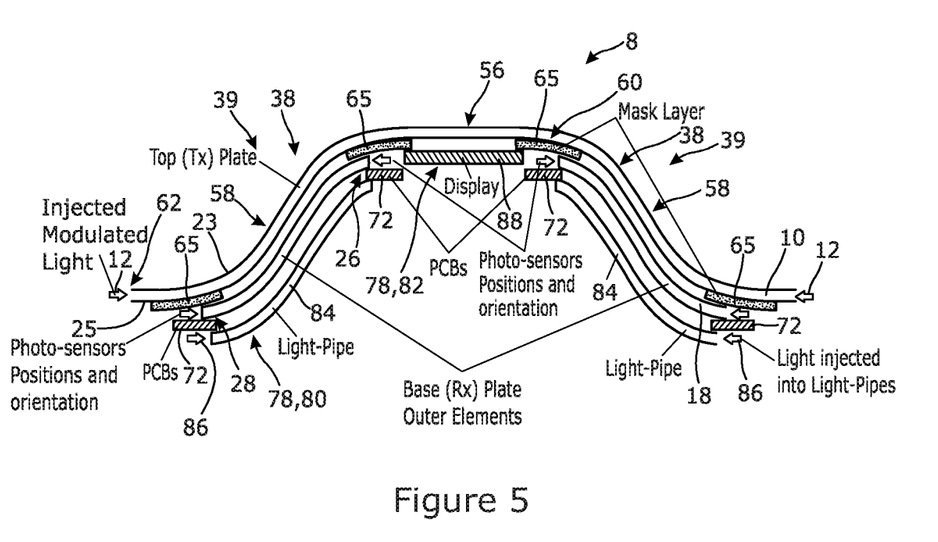
FIG. 5 is a schematic cross-sectional view of a touch screen arrangement in accordance with an embodiment of the invention, having a curved profile.
Figure 6A:
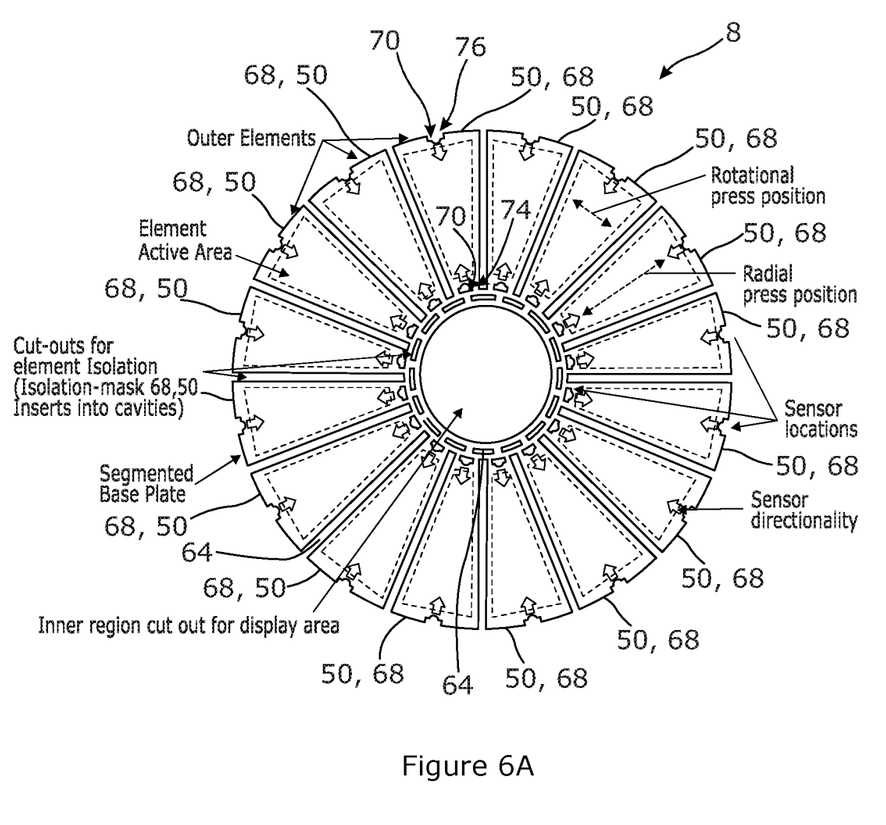
FIG. 6A is a plan view of the touch screen arrangement of FIG. 5.

Turning now to FIGS. 5 and 6A, these illustrate another embodiment of the invention in which the touch screen arrangement 8 has a curved profile. In this embodiment, the screen arrangement 8, also referred to as a touch sensitive apparatus, comprises a plurality of the touch screen elements 24 of FIG. 4.

The top plate 10 of this arrangement is contoured, and has a top face 56 that defines a central region and a curved side face 58 that defines a circumferential edge region. The top face 56 is substantially planar and generally circular in plan view. The curved side face 58 extends downwardly and radially outwardly from a circumferential edge 60 of the top face 56 to a surrounding portion 62, which in this case is a planar region, of the top plate 10.

The top plate 10 includes a touch detection region 38, in which a touch on the top plate 10 can be detected. The touch detection region 38 is defined by the curved side face 58 of the top plate 10 in this embodiment, and will be referred to in the following as an outer touch detection region 39.

It should be noted that in other embodiments the top face 56 of the top plate 10 may be touch sensitive also, as in the embodiment of FIGS. 7 and 8 that will be described later. Furthermore, the surrounding portion 62 of the top plate 10 may also have touch sensitivity in some embodiments, defining a further detection region or regions, though such additional detection regions are not shown explicitly here.

As in the arrangement of FIG. 1, light is injected into the top plate 10 from one or more light sources 12 located at an edge or multiple edges of the top plate 10, and undergoes total internal reflection in the top plate 10.

The base plate 18 is segmented to form a plurality of optically isolated base plate elements 50, which are spaced apart from the top plate 10 to define an optional middle layer 14 of air between the top and base plates 10, 18. In this embodiment, optical isolation of the base plate elements 50 is achieved by providing one or more gaps or spaces 64 between each of the base plate elements 50, in which is placed a masking strip or shape which is opaque to the frequency of the modulated light. Furthermore, masking strips 65 are provided between the top plate 10 and the base plate 18 in this embodiment to mask electronics and support structures provided beneath the top plate 10 from the user. In other embodiments the base plate elements 50 may be optically isolated by creating selectively opaque areas of the base plate 18 between each of the base plate elements 50 by means of two or more shot mouldings, or by coating the edges of the base plate elements 50 with an opaque paint etc.

Figure 9A:
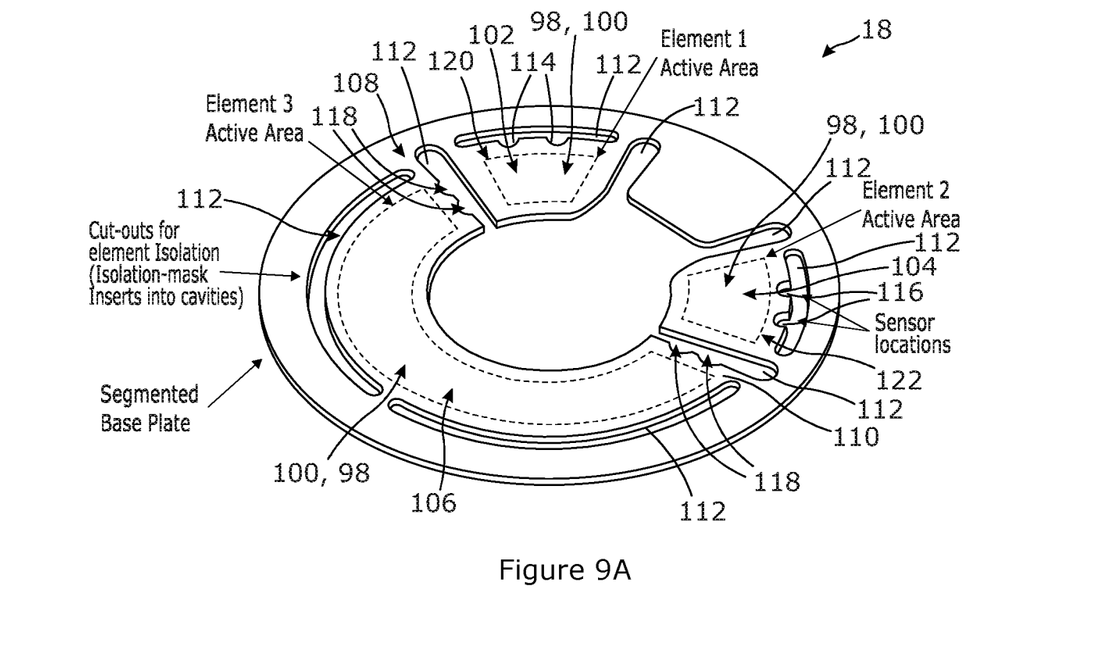
FIG. 9A is a perspective view of a segmented base plate for use in a screen arrangement in accordance with an embodiment of the invention.
Figure 9B:
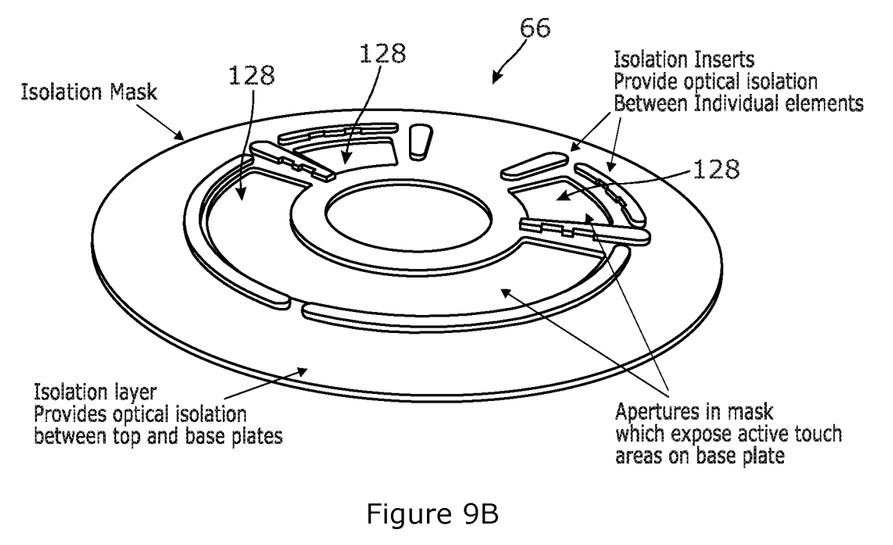
FIG. 9B is a perspective view of a mask layer which may sit between a top plate and the segmented base plate of FIG. 9A in a screen arrangement of the invention illustrating the multiple base plate elements of the arrangement.

In some embodiments the mask may be a 3-dimensional component 66 such as that shown in FIG. 9B, that is inserted between the top and bottom plates 10, 18 to provide optical isolation between the top and bottom plates 10, 18 in areas where no touch sensitivity is required, as illustrated in FIG. 9B. This can be used, as it is in the case of FIG. 9B, in conjunction with tinting of the top plate 10 to hide the presence of any electronics and support structures that are provided beneath the top plate 10 from the user. The material selected for the mask should be of a type that does not emit large amounts of evanescent light upon contact with either the top or the bottom plates 10, 18, such as EVA (Ethylene-vinyl acetate) foam, for example.

The base plate elements 50 are arranged beneath the touch detection region 38 of the top plate 10. In this embodiment, the base plate 18 elements follow or track the contours of the touch detection region 38 of the top plate 10, such that the profile of the base plate elements 50 generally match the profile of the touch detection region 38 of the top plate 10. In other embodiments, it would be possible for the base plate elements 50 to have different contouring to the overlying touch detection region 38 of the top plate 10. For example, in some embodiments, the touch detection region 38 of the top plate 10 may be contoured as in the embodiment of FIG. 5, but the base plate elements 50 may be substantially flat. In this case, additional optics may be included to route the light output from the top plate 10 to the bottom plate 18, although such additional optics may not be required in some cases, for example those in which the distance between the top plate 10 and the base plate 18 is small.

The bottom plate 18 here includes a plurality of outer base plate elements 68. The outer base plate elements 68 are positioned beneath the outer detection region 39 of the top plate 10, such that the outer detection region 39 overlies the outer base plate elements 68. In this way, the outer base plate elements 68 are configured to capture light transmitted out of the outer detection region 39 when a user touches the top plate 10 in the outer detection region 39. In particular, each outer base plate element 68 is configured to capture light transmitted from a corresponding area of the outer detection region 39 of the top plate 10 that overlies it.

Referring now to FIG. 6A, this embodiment of the invention includes multiple outer base plate elements 68. In this specific example the arrangement include sixteen outer base plate elements 68, although more or fewer outer base plate elements 68 are possible in other embodiments. The base plate elements 68 are spaced at equal intervals around the outer detection region 38.

Each outer base plate element 68 is identical to the base plate 18 of FIG. 2, having a generally trapezoidal shape in plan view, and comprising first and second ends, 26 and 28 respectively, joined by first and second sides, 30 and 32 respectively. The first end 26 of each outer base plate element 68 is positioned beneath and at the circumferential edge 60 of the top face 56 of the top plate 10. Each outer base plate element 68 extends downwardly and radially outwardly from the first end 26 to the second end 28. The first and second ends 26, 28 of each outer base plate element 68 are curved to match the contour of the overlying portion of the top plate 10, as is best seen in FIG. 5. As already noted, in other embodiments it would be possible for the contour of one or all of the base plate elements 68 to be different from that of the touch detection region 38 of the overlying top plate 10.

In this embodiment, as noted above, each outer base plate element 68 is identical to the base plate 18 of FIG. 2. In this way, each of the outer base plate elements 68 has the same level of doping of light scattering particles 18a, or doping density, and essentially the same dispersive and lossy properties. In other embodiments, however, some or all of the outer base plate elements 68 may have different levels of doping from one another.

The arrangement further comprises two outer sensors 70 associated with each outer base plate element 68. In this embodiment, the outer sensors 70 are in the form of photodiodes, and are mounted on printed circuit boards 72.

Figure 6B:
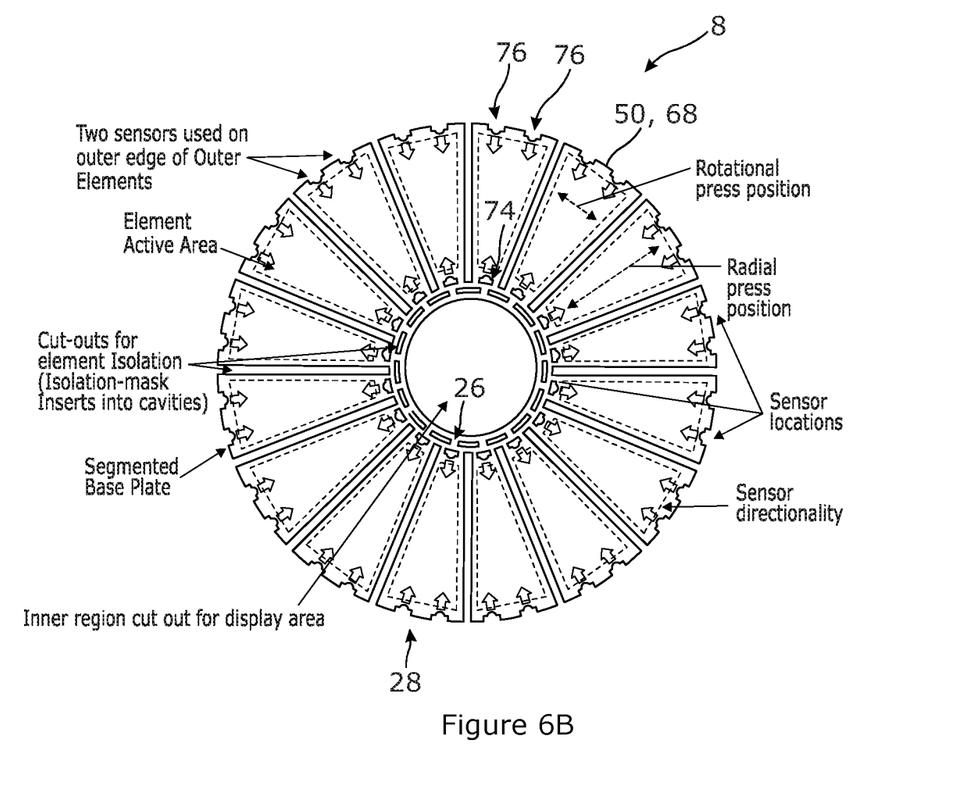
FIG. 6B is a plan view of an alternative embodiment of the touch screen arrangement of FIG. 5, in which two sensors are provided at an outer edge of each base plate element.

A first outer sensor 74 is provided at the first end 26 of each outer base plate element 68 and a second outer sensor 76 is provided at the second end 28 of each outer base plate element 68. Each of the first and second outer sensors 74, 76 are arranged to face inwardly towards their corresponding outer base plate element 68, so as to detect light that has propagated through their corresponding outer base plate element 68. Including a sensor 70 at each end 26, 28 of each outer base plate 68 element allows for the position along the length of the outer base plate element 68, also referred to as the radial position, the radial press position or the radial touch position, at which light is incident from the top plate 10 to be determined. This enables swiping actions along the base plate elements 68 to be detected. In further embodiments, multiple sensors 70 may be positioned at the first and/or the second end 26, 28 of the base plate elements 68 in order to add a further dimension of rotational position location to the element 68, i.e. to allow the position between the first and second sides 30, 32 of the base plate elements 68 to be determined. For example, in the embodiment shown in FIG. 6B, two second outer sensors 76 are provided at the second end 28 of each base plate element 68. In a dial shaped structure, this can be used to enhance rotational sensitivity of a touch on the outer sensor elements with respect to the overall system. In embodiments in which one or more sensors 70 are provided at one end of the outer base plates 68 only, the presence of a touch on the corresponding area of the top plate 10 overlying the outer base plate element 68 can be detected, but the exact radial position of the touch along the element 68 cannot be determined.

The touch screen arrangement 8 further comprises a display area 78 arranged beneath the base plate 18, and configured to display information.

The display area 78 includes an outer display area 80 beneath the outer touch detection region 38 and a central display area 82 beneath the top face 56 of the top plate 10.

The outer display area 80 comprises display elements in the form of a plurality of flexible light pipes 84 and associated LEDs 86, as shown in FIG. 5. Light pipes are known optical components that comprise an optical fibre or transparent rod for transmitting light from an LED. In this embodiment, one or more light pipes 84 comprising transparent rods are arranged beneath each outer base plate element 68, and one or more LEDs 86 for injecting light into the light pipes 84 are provided at each end of the light pipes 84. In this way, positional information regarding a touch in the outer detection region 38 can be displayed, for example by using the light pipes 84 to illuminate a region of the display area 78 incorporating the touch point on the top plate 10.

The central display area 82 comprises a display element in the form of a display screen 88. The display screen 88 is generally circular in plan view in this embodiment, and is an LCD screen, although in other embodiments the display screen 88 may take a different form, such as an OLED display.

When a user touches the first surface 23 of the top plate 10 in the outer detection region 38, light is coupled from the second surface 25 of the top plate 10 into a corresponding outer base plate element 68 below for transmission within that base plate element 68. The location at which the top plate 10 is touched determines the distance of said incident light from the first and second ends 26, 28 of the outer base plate element 68, i.e. the distance over which light needs to travel to reach the first and second outer sensors 74, 76 of the corresponding base plate element 68. The touch pressure, i.e. how hard the top plate 10 is pressed by the user, determines the absolute amount of light that is released from the top plate 10, and thus the absolute intensity of light that is captured by the corresponding base plate element 68. The absolute light intensity detected by the sensors 70 for a given touch position is therefore indicative of the touch pressure, such that a higher absolute intensity of light indicates a harder, more forceful, touch, and a lower intensity of light indicates a lighter touch to the screen arrangement 8.

Processing means (not shown), which receive data from the outer sensors 70 representative of the amount and intensity of detected light, can then calculate the radial position along the length of the outer base plate element 68 between its first and second ends 26, 28 at which the escaped light from the top plate 10 was incident, and the touch pressure, in the same manner as already described in respect of the arrangement of FIG. 2. Losses in transmission between entry of light into the base plate element 68 and the one or more detectors or sensors 70 associated with the base plate element 68 are used by the processing means to determine the position of a touch. As the curvature is not so excessive as to cause significant additional light loss, due to the angle of total internal reflection being exceeded, then the slight increase in loss due to curvature of the base plate element 68 requires no significant change to the radial position calculation process. The calculations required are relatively simple given the logarithmic nature of light loss with distance from the sensor 70.

The display area 78 can then be controlled based on the nature and position of the touch.

For example, a touch in the outer touch detection region 38 may cause illumination in the corresponding area of the outer display area 80. Alternatively or additionally, a touch in the outer touch detection region 39 may cause illumination in any other region of the screen arrangement 8 having display capability. For example, a touch in the outer touch detection region 39 may cause illumination in another area of the outer display area 80 remote from the touch point. As a further example, a touch in the outer touch detection region 39 may cause illumination of all or a part of the central display area 82. It should also be appreciated that other display areas may be provided in other embodiments. These display areas may be associated with another touch detection region 38, or may simply be display areas that are configured to display information when a user touches the top plate 10 in a touch detection region 38 remote from the display area. It should also be understood that illumination of the display area 78, and the type of information displayed by virtue of this illumination, will depend on the specific application of the screen arrangement 8.

Depending on the specific embodiment of the screen arrangement 8, a touch in a specific location, and/or a specific type of touch, may be associated with a specific control functionality. For example, in an embodiment in which the screen arrangement 8 is incorporated in a control screen for a speaker, a touch in a certain region, and/or a certain type of touch, may result in a device setting being selected, as well as or in addition to illumination of the control screen at some appropriate location.

In addition to the screen arrangement 8 being configured to display information based on the position of the touch, as indicated already, the screen arrangement 8 may be configured such that information is displayed based on the nature of the touch.

For example, a swiping action by a user may cause specific information to be displayed or a specific action to be taken, for example a specific device setting to be selected. In the embodiment of FIGS. 5 and 6A for example, a swiping action along the length of the top plate 10 overlying a base plate element 68 can be detected, and may cause specific information to be displayed or a specific action to be taken, such as the control of a volume setting.

As another example, multiple touches occurring in the outer touch detection region 39 simultaneously may be detected and attributed with different control functionalities. For example, taking again the example of a control panel for a speaker system, a two-fingered tap in the outer detection region 39 may cause, for example, the speaker output to pause.

Furthermore, it would be possible to configure the outer detection region 39 of FIGS. 5 and 6A for use as a 'static dial'. That is, it would be possible to configure this arrangement such that, when a user grasps the outer detection region 39 and moves their fingers as if to rotate a rotatable dial, then a control functionality usually associated with rotation of a rotatable dial is carried out. Again taking the example of a control panel for a speaker system, the arrangement may be configured such that if a user grasps the outer detection region 39 and turns their hand as if rotating a moveable dial, the volume of the speaker is increased or decreased accordingly.

It would also be possible to configure the outer detection region 39 for use as a computer mouse. For example, it would be possible for the system to be configured such that grasping or pinching the outer detection region 39 causes an action on an associated screen that would usually be caused by clicking a button of a standard mouse. It would also be possible to configure the outer detection region 39 such that scrolling or sweeping actions in the outer detection region 39 cause an action on an associated screen that would usually be caused by moving a standard mouse, i.e. moving of a pointer on a screen.

In the embodiment of FIGS. 5 and 6A, which includes a sensor 70 at each end 26, 28 of each outer base plate element 68, the position along the length of the outer base plate element 68 at which light is incident on the outer base plate element 68 from the top plate 10 can be determined. Thus, scrolling or sweeping actions up and/or down the curved side surface defining the outer detection region 39 of the top plate 10 can be detected. In response to such an action, the display area 78 may be illuminated to follow the sweeping action. For example, a user swiping their finger along a region of top plate 10 overlying an outer base plate element 68, from its first end 26 to its second end 28, may cause the display area 78 to illuminate from its first end 26 to its second end 28 in accordance with this movement.

Swiping around the outer detection region 39, over a region of the top plate 10 overlying multiple outer base plate elements 68, may result in illumination of the display area 78 associated with each of these base plate elements 68 in turn. Performing such a sweeping action whilst grasping the outer detection region 39 between two or more fingers may essentially mimic the action of rotating a rotatable dial, as already explained, which can then be used in the manner in which a rotatable dial may be used, e.g. as a volume or other suitable control.

Pressure applied simultaneously at different areas of the top plate 10, associated with different outer base plate elements 68, can be detected and indicate that a user is grasping or pinching the dial region defining the outer detection region 39, or simply that they are pressing the outer detection region 39 in more than one area, and these actions may themselves have an associated control functionality.

The skilled person will understand that the above is just a selection of the functionality that a screen arrangement 8 as shown in FIGS. 5 and 6A might have. Depending on the intended use of the screen arrangement 8, many other functionalities are possible.

Figure 7:
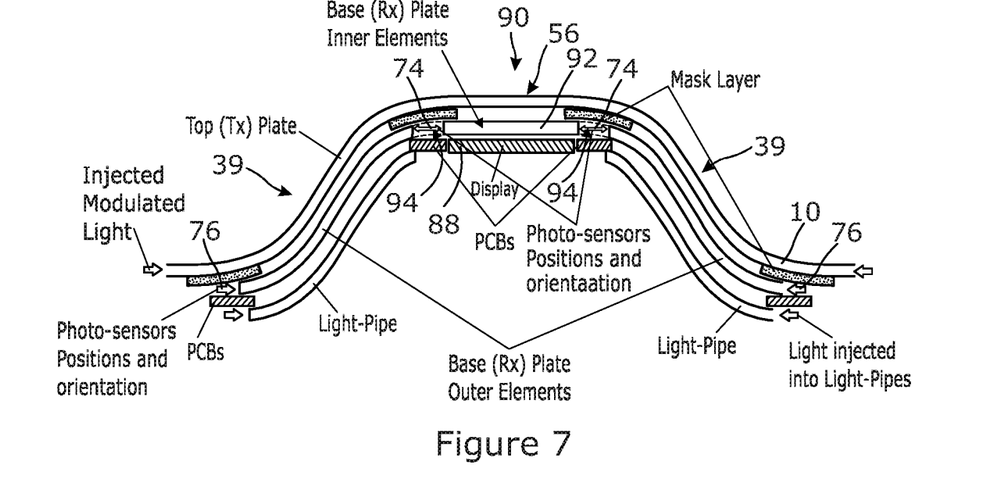
FIG. 7 is a schematic cross-sectional view of a touch screen arrangement having a curved profile in accordance with another embodiment of the invention.
Figure 8:
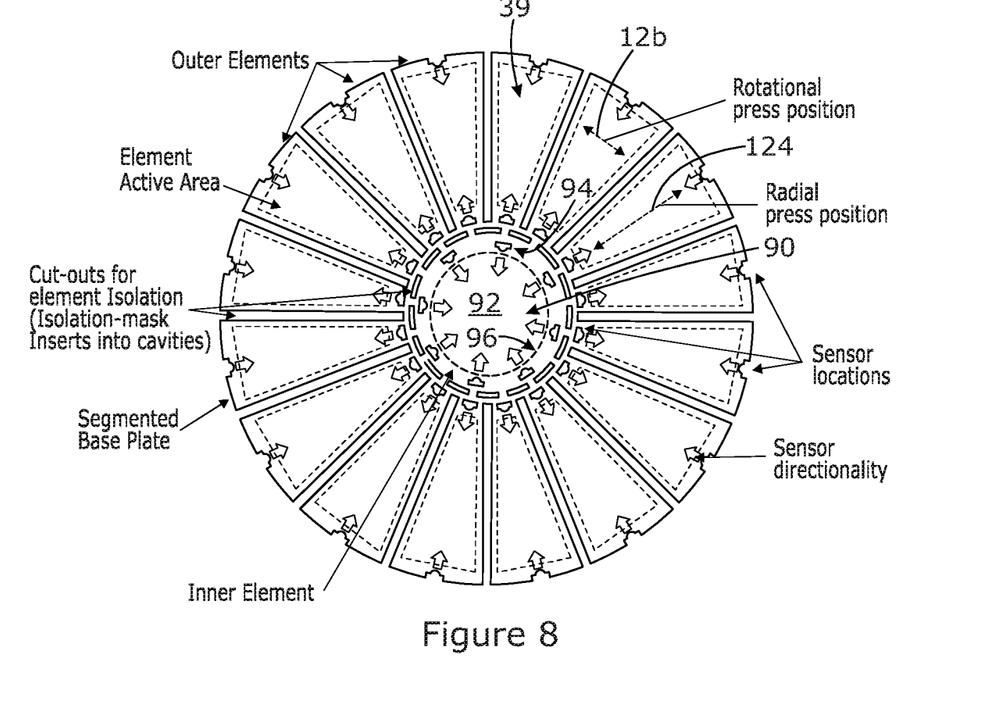
FIG. 8 is a plan view of the touch screen arrangement of FIG. 7.

FIGS. 7 and 8 illustrate another embodiment of the invention. Many aspects of this embodiment are the same as the embodiment of FIGS. 5 and 6A and, for conciseness, like features will not be described again here. Where this embodiment differs from that of FIGS. 5 and 6A is that in addition to the touch-sensitive outer detection region 39, the screen arrangement of FIGS. 7 and 8 further comprises a touch-sensitive central detection region 90.

The central detection region 90 is defined by the top face 56 of the top plate 10, which is substantially planar and generally circular in plan view. To enable touch-detection, a central base plate element 92 is arranged beneath the central touch detection region 90 of the top plate 10, to lie underneath the central touch detection region 90, such that the central touch detection region 90 overlies the central base plate element 92. In this way, the central base plate element 92 is configured to capture light transmitted out of the central touch detection region 90 when a user touches the top plate 10 in the central touch detection region 90.

Referring to FIG. 8 in particular, the central base plate element 92 is multi-sided in shape in this embodiment, and forms a top face 56 of the base plate 18.

At least one central sensor 94 for detecting light exiting the central base plate element 92 is positioned at an edge 96 of the central base plate element 92. In this embodiment, eight central sensors 94 are spaced at equal intervals around the edge 96 of the central base plate element 96, and face inwardly towards the centre of the central base plate element 96.

Using this approach, it can be seen how three different types of base plate element, and so three different types of touch screen element, can all be used in one touch screen apparatus: one type involving a base plate element which may have only a single sensor and which detects presence or absence of a touch; a second type which has sensors associated with each end and which can detect location of a touch and also movement between the two ends; and also a third type which has sensors to detect position on a two-dimensional surface as for a conventional touch screen. These may all be constructed together in one device, and may even be disposed between a continuous (even an optically continuous) top plate.

As in the embodiment of FIGS. 5 and 6A, a display screen 88 is arranged beneath the top face 56 of the top plate 10. However, in this embodiment the display screen 88 is also arranged beneath the central base plate element 92, such that the central base plate element 92 sits between the top plate 10 and the display screen 88.

When a user touches the top plate 10 in the central detection region 90, light is transmitted out of the top plate 10 and into the central base plate element 92 below. The location at which the top plate 10 is touched, and the nature of the touch, can be determined in the same manner as already described using associated processing means (not shown).

The display area 78 can then be controlled based on the nature and position of the touch, in a similar manner to that already described in relation to the embodiment of FIGS. 5 and 6A. For example, a touch in the central detection region 90 may cause illumination of the corresponding point or area of the display screen 88. A touch in the central detection region 90 may cause the display of predetermined information in the central display area 82. A touch in the central detection region 90 may cause illumination and/or the display of information across all or some of the outer display area 80. Furthermore, a touch in the central detection region 90 may cause an action to occur, such as a device to be turned on or off, etc. Many other functionalities are possible, as will be understood by the skilled person.

Figure 10:
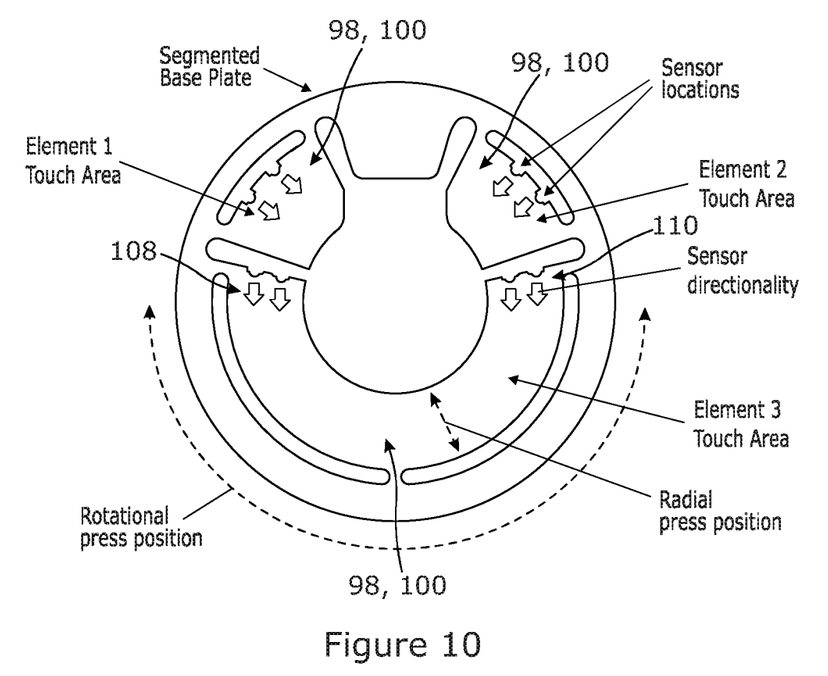
FIG. 10 is a plan view of the segmented base plate of FIG. 9.

FIGS. 9A and 10 illustrate a base plate 18 of a further embodiment of the invention. The base plate 18 of this embodiment is segmented, or patterned, to define a number of optically isolated touch detection regions 38 when incorporated in a screen arrangement 8 for use.

The base plate 18 of FIGS. 9A and 10 is substantially planar, and generally circular in shape in plan view. In other embodiments, the base plate 18 may be curved or contoured, and may take another shape.

In this embodiment, the base plate 18 includes three distinct regions 98, which correspond to three distinct touch-sensitive regions when incorporated in a screen arrangement 8. These three distinct regions 98 of the base plate 18 will be referred to as elements 100 of the base plate 18. That is, the base plate of this embodiment includes a first base plate element 102, a second base plate element 104 and a third base plate element 106. Each of the base plate elements 100 form part of the same common fabric, and all form part of the same larger base plate 18, but are optically isolated from one another, as will be explained.

The first and second base plate elements 102, 104 are each generally trapezoidal in shape, and are of substantially the same size as each other. The third base plate element 106 has a first end 108 adjacent the first base plate element 102 and a second end 110 adjacent the second base plate element 104. The third base plate element 106 extends between the first and second base plate elements 102, 104, about the circumference of the circular base plate 18, so as to describe a curve between its first and second ends 108, 110 and form a curved strip.

The base plate elements 100 are optically isolated from one another by means of openings or cut-outs 112 in the baseplate 18 into which are inserted opaque masking strips/shapes. Specifically, the base plate 18 includes cut-outs 112 that define outer edges of each of the base plate elements 100. Although this embodiment of the invention utilises cut-outs 112 to create optically isolated segments of the base plate 18, the skilled person understands that many different ways of creating such optical isolation exist, and could be utilised in a base plate 18 of an embodiment of the invention. As one example, the optically isolated base plate elements 18 may be realised by creating selectively opaque areas to segment the base plate by means of two or more shot moldings, etc.

The cut-outs 112 also define a plurality of sensors-receiving openings for receiving sensors 20, which in this example are in the form of photodiodes. The sensor-receiving openings comprise two first sensor-receiving openings 114, two second sensor-receiving openings 116 and four third sensor-receiving openings 118. The first sensor-receiving openings 114 are provided at an outer edge 120 of the first base plate element 102. The second sensor-receiving openings 116 are provided at an outer edge 122 of the second base plate element 104. Two of the third sensor-receiving openings 118 are provided at the first end 108 of the third base plate element 106 and two of the third sensor-receiving openings 118 are provided at the second end 110 of the third base plate element 106. In this case multiple sensors 20 are used to increase the light collection efficiency from the base plate 10 and also to make the third base plate element 106 much less susceptible to variations in the radial position 124 for any given press as the third element 106 is primarily concerned with the rotational position 126 of a press as shown in FIG. 10.

When a screen arrangement 8 incorporating the base plate 18 of this embodiment is assembled, a first sensor (not shown) for detecting light exiting the first base plate element 102 is received in each of the first sensor-receiving openings 114. Correspondingly, a second sensor (not shown) for detecting light exiting the second base plate element 104 is received in each of the second sensor-receiving openings 116 and a third sensor (not shown) for detecting light exiting the third base plate element 106 is received in each of the third sensor-receiving openings 118. Each of the sensors 20 face towards their associated base plate element 102, 104, 106 to detect light exiting their associated base plate element 102, 104, 106.

When incorporated in a screen arrangement 8 for use, the base plate 18 may be provided beneath a substantially planar top plate 10, such that the regions of the top plate 10 that overlie the first, second and third base plate elements 102, 104, 106 respectively define first, second and third touch detection regions. As in other embodiments, the top plate 10 may have the same dimensions as the base plate 18, such that the edges of the top plate 10 terminate at the edges of the base plate 18, or may extend beyond the limits of base plate 18.

In the latter case where the top plate 10 extends beyond the limits of the base plate 18 then a masking or mask layer 66, as shown in FIG. 9B, can be inserted between the top plate 10 and the base plate 18 and provide optical separation between the top plate 10 and the base plate 18. The mask layer 66 shields the base plate 18 and ensures that a press or touch on the top plate 10 can only introduce light into the base plate 18 within the required areas of touch sensitivity, which are associated with openings 128 in the masking layer 66. In the case shown in FIG. 9C, the 3-dimensional masking layer 66 combines the mask inserts required for individual base plate element isolation with the inter-plate mask used to shield the base plate 18 from stray light from touches on the top plate 10 which are outside of active touch areas.

It can thus be seen that optical isolation strategies can be combined according to device requirements—masking between the top plate and the base plate may be used, blocking of any light path between adjacent base plate elements may be used, or the two approaches may be used in combination.

Processing means (not shown) receive data from the sensors 20 representative of the amount and intensity of detected light, and operation of a screen arrangement 8 incorporating the base plate 18 of FIGS. 9A and 10 is essentially the same as has been described already in relation to the preceding embodiments.

With the sensors 20 provided in this embodiment, the presence of a touch in the first touch detection region and the second touch detection region can be detected, as well as the force of the touch, i.e. the touch pressure or the intensity of pressure of a touch. The system can detect if a user is touching the top plate in the first and second touch detection regions, but cannot detect the location of the touch within these regions. Thus, the first and second base plate elements 102, 104 are of a first base plate element type adapted to detect presence or absence of a touch, but not position of the touch, such that the first and second touch detection regions effectively act as buttons.

The presence and position of a touch in the third touch detection region can be determined, as well as the touch pressure, due to the inclusion of sensors 20 at both the first and second ends 108, 110 of the third base plate element 106. Thus, the third base plate element 106 is a second base plate element type adapted to detect presence of a touch and position of the touch between its first and second ends 108, 110, each of which are provided with associated sensors 20 received in the sensor-receiving openings 118 of the third base plate element 106.

One possible implementation of this arrangement is for use in a screen arrangement 8 that forms a control panel for a speaker system. In this case, the first and second touch detection regions could essentially form buttons that control track selection such that, for example, a touch in the first touch detection region selects or directs to the previous audio track and a touch in the second touch detection region selects or directs to the next audio track. The third touch detection region, which has the capability to detect the position of a touch, could be used, for example, as a volume control slider. In this case, a user may swipe their finger in one direction along the third detection region to turn up the volume, and may swipe their finger in an opposing direction in the third detection region to turn down the volume.

It should be appreciated that, although the segmented base plate 18 of FIGS. 9A and 10 is substantially planar in this example, in other embodiments the base plate 18 may be curved or contoured.

Examples of devices in which a touch screen arrangement 8 of the invention may be used are handheld or portable devices such as smartphones, tablets or laptops, as well as large electronic devices such as washing machines, refrigerators or other white goods, although the invention is clearly not limited to use in these products.

Figure 11:
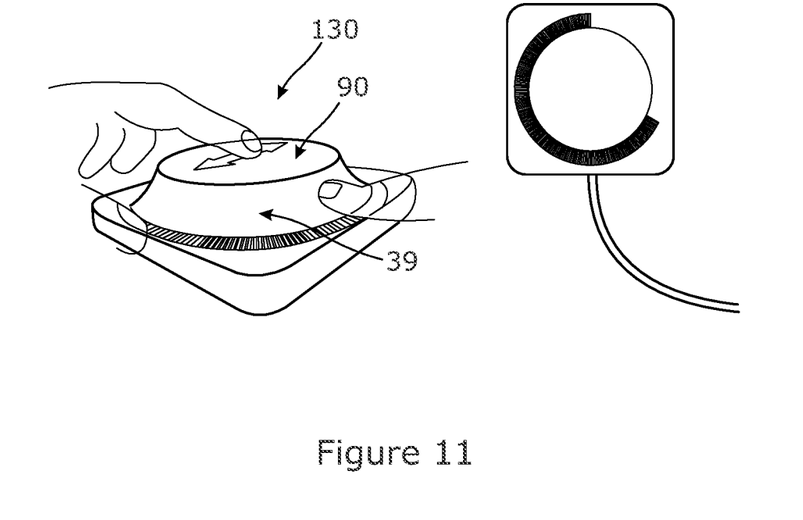
FIG. 11 illustrates a device incorporating the touch screen arrangement of FIG. 7.
Figure 12:
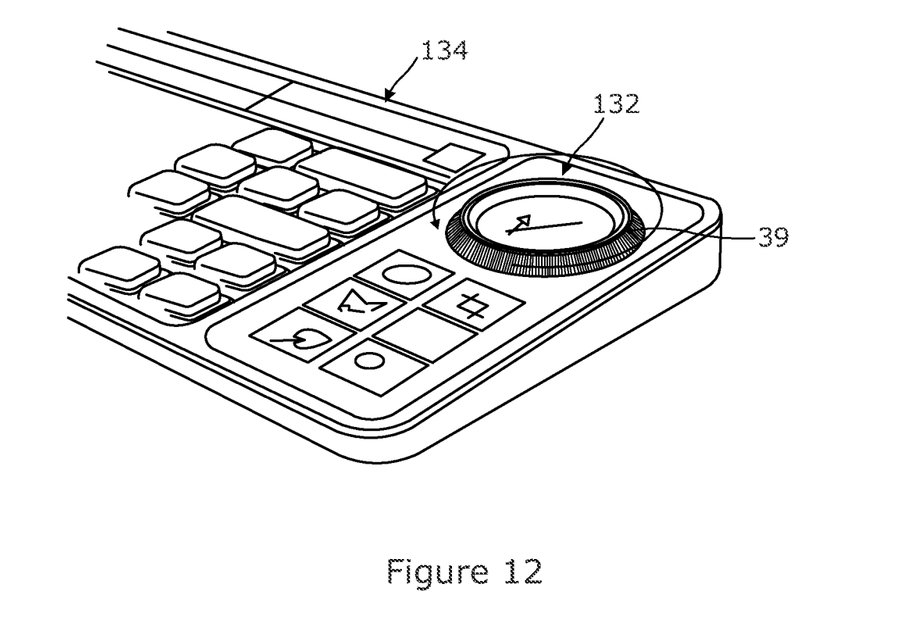
FIG. 12 illustrates another device incorporating the touch screen arrangement of FIG. 7.

FIGS. 11 and 12 show two examples of devices comprising the curved touch screen arrangement 8 of FIGS. 7 and 8.

FIG. 11 illustrates the curved touch screen arrangement 8 of FIGS. 7 and 8, implemented in a touch mouse 130 that may be used, for example, with a laptop (not shown). FIG. 12 illustrates the touch screen arrangement of FIGS. 7 and 8, incorporated as a touch mouse 132 that is integrated in a keyboard 134.

In these implementations, scrolling and swiping in the different detection regions enables different actions to be performed on an associated screen, for example a laptop screen, without movement of any part of the touch screen arrangement. For example, swiping in a detection region in a particular direction may cause a specific action to be carried out or performed on a screen. That is, the system may be configured such that swiping upwards or downwards in a detection region, or in any other direction, causes a specific action or control to be carried out. Thus, the technology of the invention may provide a static dial, as explained already, which allows for swiping, scrolling and pressure applied by a user on the dial to be detected, without movement of any parts of the dial itself.

In general, embodiments of the invention allow for the position and the type of touch to be detected. As explained, depending on the arrangement of the sensors 20 associated with the base plate 18, the presence of a touch may be detected, or the presence and associated position of a touch may be determined. Position detection provides additional useful functionality to a system, in that it allows for movement, i.e. swiping or scrolling actions, to be detected. In addition, the force of a touch, i.e. the touch pressure, may be determined with all sensor configurations, as well as the duration in time of a touch. The ability to determine touch pressure may have many different applications, as will be understood by the skilled person, that include but are not limited to the ability for different touch pressures, or the detection of a dynamic change in touch pressure, to be attributed with different control functions. For example, a shorter, lighter, touch could turn off a screen of an associated device, and a forceful, longer, touch could turn off the device itself. Furthermore, the ability to determine touch pressure could allow for light touches, which may be accidental and which the system can deem to be so due to the small force applied, to be ignored, thereby reducing the likelihood of e.g. accidental activation of a device or a control function.

In addition to the above, the use of multiple light collection plates, i.e. multiple base plate elements, which are each treated essentially as separate detection systems, allows for multiple touches occurring simultaneously to be readily detected, without any additional processing complexity. Furthermore, this segmenting of the base plate 18 produces touch detection regions which are easy to customize, depending on the application in which they are to be used. The top plate 10 of these arrangements advantageously provides a multi-sense surface, on which the presence, position, and type of touch can be detected in multiple different regions of the top plate 10, depending on the specific configuration of the touch screen arrangement 8.

As just one example of possible customization of touch detection regions of a multiple base plate element system, in embodiments in which the base plate elements are doped with light scattering particles, some or all of these base plate elements may be provided with different doping densities. The chosen doping density may depend, for example, on the required detection range or on the intended functionality of the different touch sensitive areas defined by the different base plate elements. For example, when the intended use of a touch sensitive region requires the position of a touch to be determined with a high degree of accuracy then it may be preferable to use a higher doping level than in a touch sensitive region in which it is only required to detect the presence of a touch.

It will be appreciated by a person skilled in the art that the invention could be modified to take many alternative forms to that described herein, without departing from the scope of the appended claims.

The invention claimed is:

1. A touch sensitive apparatus comprising:
   a top plate having one or more light sources associated therewith, such that light from the one or more light sources is transmitted within the top plate with total internal reflection;
   a base plate, wherein light is transmissible within the base plate, wherein the base plate comprises a plurality of base plate elements optically separated from each other;
   wherein the top plate and the base plate are configured such that if an external body touches a first surface of the top plate thereby performing a touch, then light is coupled from a second surface of the top plate into an underlying base plate element for transmission within that base plate element towards one or more edges of that base plate element;
   wherein each base plate element has one or more detectors associated therewith for detecting light transmitted within that base plate element;
   the touch sensitive apparatus further comprising processing means to determine information from the detectors relating to touching of the first surface of the top plate.

2. The touch sensitive apparatus of claim 1, wherein one or more of the base plate elements is of a first base plate element type adapted to detect presence or absence of a touch but not position of the touch.

3. The touch sensitive apparatus of claim 2, wherein one or more of the base plate elements of the first base plate element type is also adapted to detect intensity of pressure of a touch.

4. The touch sensitive apparatus claim 1, where one or more of the base plate elements is of a second base plate element type having a first end and a second end, one or more first end detectors associated with the first end and one or more second end detectors associated with the second end, wherein the base plate element of the second type is adapted to detect presence of a touch and position of the touch between the first end and the second end.

5. The touch sensitive apparatus of claim 4, wherein one or more of the base plate elements of the second base plate element type is also adapted to detect intensity of pressure of a touch.

6. The touch sensitive apparatus of claim 4, wherein the processing means is adapted to detect motion along base plate elements of the second type between the first end and the second end.

7. The touch sensitive apparatus of claim 4, wherein some or all of the base plate elements are lossy, and wherein losses in transmission between entry of light into the base plate element and the one or more detectors associated with the base plate are used by the processing means to determine the position of a touch.

8. The touch sensitive apparatus of claim 7, wherein lossy base plate elements are doped to provide transmission losses, and wherein different levels of doping are provided in base plate elements of different base plate element types.

9. The touch sensitive apparatus of claim 1, wherein one or more of the base plate elements of the second type describes a curve between the first and the second end.

10. The touch sensitive apparatus of claim 1, wherein the top plate is not planar.

11. The touch sensitive apparatus of claim 10, wherein there are one or more projecting regions elevated from the top plate having one or more base plate elements associated therewith.

12. The touch sensitive apparatus of claim 11, wherein at least one of the projecting regions comprises a central region with a circumferential edge region between the central region and a planar region of the top plate, wherein the circumferential edge region has one or more base plate elements associated therewith.

13. The touch sensitive apparatus of claim 12, wherein one or more of the base plate elements is of a second base plate element type having a first end and a second end, one or more first end detectors associated with the first end and one or more second end detectors associated with the second end, wherein the base plate element of the second type is adapted to detect presence of a touch and position of the touch between the first end and the second end, and wherein the circumferential edge region has a base plate element of the second type disposed thereunder to detect touches on the circumferential edge region.

14. The touch sensitive apparatus of claim 13, where the processing means provides the base plate element of the second type disposed under the circumferential edge region with functionality of a dial.

15. The touch sensitive apparatus of claim 12, wherein one or more base plate elements lie underneath the central region.

16. The touch sensitive apparatus of claim 15, wherein the base plate element lying underneath the central region is of a third base plate element type, wherein the base plate element of the third type is adapted to detect presence of a touch and position of the touch on the central region.

17. The touch sensitive apparatus of claim 16, wherein some or all of the base plate elements are lossy, and wherein losses in transmission between entry of light into the base plate element and the one or more detectors associated with the base plate are used by the processing means to determine the position of a touch.

18. The touch sensitive apparatus of claim 1, wherein the touch sensitive apparatus is adapted to identify simultaneous touches on the top plate and simultaneous touches associated with different base plate elements, wherein the processing means is adapted to associate simultaneous touches on different base plate elements with a user action.

19. The touch sensitive apparatus of claim 1, where the top plate is optically continuous over a plurality of base plate elements.

20. A method of operating a user interface comprising touch sensitive apparatus, the touch sensitive apparatus having a top plate having one or more light sources associated therewith, such that light from the one or more light sources is transmitted within the top plate with total internal reflection, a base plate, wherein light is transmissible within the base plate, wherein the base plate comprises a plurality of base plate elements optically separated from each other, wherein the top plate and the base plate are configured such that if an external body touches a first surface of the top plate thereby performing a touch, then light is coupled from a second surface of the top plate into an underlying base plate element for transmission within that base plate element towards one or more edges of that base plate element, a plurality of detectors, wherein each base plate element has one or more detectors of the plurality of detectors associated therewith for detecting signals from light transmitted within that base plate element, and the touch sensitive apparatus further comprises processing means, the method comprising the processing means:
   detecting a plurality of user touch events at the touch sensitive apparatus from signals received from the plurality of detectors; and
   interpreting the plurality of user touch events as a user interface action.

* * * * *